United States Patent
Miyazawa

(10) Patent No.: US 10,158,803 B2
(45) Date of Patent: Dec. 18, 2018

(54) VIBRATION DETECTION APPARATUS, VIBRATION DETECTION METHOD, AND IMAGE CAPTURING APPARATUS

(71) Applicant: CANON KABUSHIKI KAISHA, Tokyo (JP)

(72) Inventor: Hitoshi Miyazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 15/414,719

(22) Filed: Jan. 25, 2017

(65) Prior Publication Data

US 2017/0214855 A1  Jul. 27, 2017

(30) Foreign Application Priority Data

Jan. 26, 2016  (JP) ................. 2016-012790

(51) Int. Cl.
    *H04N 5/232*  (2006.01)
(52) U.S. Cl.
    CPC ..... *H04N 5/23287* (2013.01); *H04N 5/23248* (2013.01); *H04N 5/23251* (2013.01); *H04N 5/23254* (2013.01); *H04N 5/23261* (2013.01); *H04N 5/23264* (2013.01)
(58) Field of Classification Search
    CPC .......... H04N 5/23251; H04N 5/23287; H04N 5/23248; H04N 5/23254; H04N 5/23258; H04N 5/23261; H04N 5/23264; G06T 7/20
    See application file for complete search history.

(56) References Cited

U.S. PATENT DOCUMENTS

| | | | | |
|---|---|---|---|---|
| 2008/0094498 | A1* | 4/2008 | Mori | G03B 5/02 348/352 |
| 2009/0135261 | A1* | 5/2009 | Imamura | H04N 5/144 348/208.99 |
| 2015/0003676 | A1* | 1/2015 | Kuchiki | G06T 7/2053 382/103 |
| 2015/0237260 | A1* | 8/2015 | Mukunashi | H04N 5/23287 348/208.11 |
| 2016/0165139 | A1* | 6/2016 | Takayanagi | H04N 5/23261 348/208.4 |

(Continued)

FOREIGN PATENT DOCUMENTS

| JP | 2006-317848 A | 11/2006 |
|---|---|---|
| JP | 2015-161730 A | 9/2015 |

*Primary Examiner* — Abdelaaziz Tissire
(74) *Attorney, Agent, or Firm* — Cowan, Liebowitz & Latman, P.C.

(57) ABSTRACT

A vibration detection apparatus comprising: an extraction unit that extracts, from among a plurality of motion vectors obtained from a difference between frames of images output from an image sensor for predetermined regions set in the images, motion vectors that exist outside a range determined based on an angular velocity of vibration, as subject vectors, and outputs an average value of the extracted subject vectors; and an acquisition unit that obtains, in panning shooting, a correction amount of a correction unit based on the average value and the angular velocity in a case where the subject vectors were extracted. The extraction unit sets the range narrower in a case where the angular velocity is less than a predetermined threshold value than in a case where the angular velocity is greater than or equal to the threshold value.

10 Claims, 6 Drawing Sheets

(56) References Cited

U.S. PATENT DOCUMENTS

2016/0301871 A1* 10/2016 Kuchiki ............. H04N 5/23261
2017/0155842 A1*  6/2017 Takayanagi ............. G06T 5/003
2017/0214838 A1*  7/2017 Miyazawa ........... H04N 5/2352

* cited by examiner

VIBRATION DETECTION APPARATUS, VIBRATION DETECTION METHOD, AND IMAGE CAPTURING APPARATUS

BACKGROUND OF THE INVENTION

Field of the Invention

The present invention relates to a vibration detection apparatus and a vibration detection method, and an image capturing apparatus.

Description of the Related Art

Panning shooting is one camera shooting method. The panning shooting is a method in which shooting is performed by following a moving subject with a camera, and in general, the shooting is performed with a slow shutter speed so as to generate a dynamic feeling of the subject.

However, experience is needed in shooting a subject (train moving at 60 km/h, for example) while panning the camera so as to appropriately follow the subject at a slow shutter speed (1/30 s, for example). In particular, it is difficult for a beginner to adjust the panning speed of the camera to the speed of the subject during an exposure period at a slow shutter speed, and therefore, the panning shooting is a difficult shooting method.

In Japanese Patent Laid-Open No. 2006-317848, a method is disclosed in which the difference between a subject speed and a panning speed of the camera is detected, and the shift amount corresponding to the difference is corrected using an image stabilization function in order to easily realize the panning shooting. In this method, an angular velocity sensor in the camera detects, immediately before shooting, the angular velocity with respect to the panning (or tilting) of the camera following the subject. A moving amount of a main subject image on an imaging plane is detected at the same time. The angular velocity of the subject is calculated from the detected panning speed and the moving amount of the subject image on the imaging plane. Then, an image stabilization operation is performed during exposure in accordance with the calculated difference amount between the angular velocity of the main subject and the output of the angular velocity sensor in the camera. Accordingly, the difference (subject vibration amount) between the main subject speed and the panning speed of the camera, and the camera shake amount are corrected, and thus the image blur of the main subject that is the target of the panning shooting can be restricted.

Also, a method in which the motion of an image is detected using a motion vector is known as a technique for detecting a movement in a screen, and a correlation method based on a correlation operation, a block matching method, and the like are known as a detection method of the motion vector. In the block matching method, an image signal that is input is divided into a plurality of block regions each having an appropriate size, and differences from pixels in a certain range of the previous frame is calculated for each block. Then, a block in the previous frame with which the sum of absolute values of the differences is the minimum is searched for. The relative shift, between frames, of each block and the corresponding searched block represents the motion vector of the block.

Also, in Japanese Patent Laid-Open No. 2015-161730, a method for improving detection accuracy of a subject vector is disclosed in which vectors in a frame that are detected from motion vectors and an angular velocity sensor or the like that detects vibration applied to the camera are both utilized. In this method, the vectors in the frame are compared with an on-imaging plane moving amount on an imaging plane that has been converted from the angular velocity, and vectors in the vicinity of the on-imaging plane moving amount are determined as background vectors, and vectors that are separate from the on-imaging plane moving amount by an amount greater than or equal to a certain amount are determined as the subject vectors.

However, in a shooting scene such as that of taking a panning shot of a slow moving subject, because the panning speed at the time of following the subject is low, the output of the angular velocity becomes small, and the difference between the subject vectors and the background vectors decreases. As a result, almost all the vectors are erroneously detected as the subject vectors, and accurate detection of the subject vectors cannot be performed.

SUMMARY OF THE INVENTION

The present invention has been made in consideration of the above situation, and a motion vector of a main subject in a frame is more accurately detected, and the accuracy of image stabilization is improved.

According to the present invention, provided is a vibration detection apparatus comprising: an extraction unit that extracts, from among a plurality of motion vectors that are detected by a first vibration detection unit that obtains and outputs, from a difference between frames of images that are output from an image sensor, the motion vectors respectively for a predetermined plurality of regions that are set in the images, motion vectors that exist outside a range that is determined based on an angular velocity detected by a second vibration detection unit that detects an angular velocity of vibration, as subject vectors that indicate movement of a subject, and outputs an average value of the extracted subject vectors; and an acquisition unit that obtains, in a panning shot, a correction amount of a correction unit that optically corrects vibration based on the average value and the angular velocity in a case where the subject vectors were extracted by the extraction unit, wherein the extraction unit sets the range narrower in a case where the angular velocity is less than a predetermined threshold value than in a case where the angular velocity is greater than or equal to the threshold value.

Further, according to the present invention, provided is an image capturing apparatus comprising: a vibration detection apparatus including: an extraction unit that extracts, from among a plurality of motion vectors that are detected by a first vibration detection unit that obtains and outputs, from a difference between frames of images that are output from an image sensor, the motion vectors respectively for a predetermined plurality of regions that are set in the images, motion vectors that exist outside a range that is determined based on an angular velocity detected by a second vibration detection unit that detects an angular velocity of vibration, as subject vectors that indicate movement of a subject, and outputs an average value of the extracted subject vectors; and an acquisition unit that obtains, in panning shooting, a correction amount of a correction unit that optically corrects vibration based on the average value and the angular velocity in a case where the subject vectors were extracted by the extraction unit, wherein the extraction unit sets the range narrower in a case where the angular velocity is less than a predetermined threshold value than in a case where the angular velocity is greater than or equal to the threshold value; and the image sensor, wherein the image capturing apparatus can be attached to or detached from an imaging optical system that includes the correction unit.

Furthermore, according to the present invention, provided is an image capturing apparatus comprising: a vibration detection apparatus including: an extraction unit that extracts, from among a plurality of motion vectors that are detected by a first vibration detection unit that obtains and outputs, from a difference between frames of images that are output from an image sensor, the motion vectors respectively for a predetermined plurality of regions that are set in the images, motion vectors that exist outside a range that is determined based on an angular velocity detected by a second vibration detection unit that detects an angular velocity of vibration, as subject vectors that indicate movement of a subject, and outputs an average value of the extracted subject vectors; and an acquisition unit that obtains, in panning shooting, a correction amount of a correction unit that optically corrects vibration based on the average value and the angular velocity in a case where the subject vectors were extracted by the extraction unit, wherein the extraction unit sets the range narrower in a case where the angular velocity is less than a predetermined threshold value than in a case where the angular velocity is greater than or equal to the threshold value; the image sensor; and the correction unit that optically corrects vibration based on a correction amount.

Further, according to the present invention, provided is a vibration detection method comprising: extracting, from among a plurality of motion vectors that are detected by a first vibration detection unit that obtains and outputs, from a difference between frames of images that are output from an image sensor, the motion vectors respectively for a predetermined plurality of regions that are set in the images, motion vectors that exist outside a range that is determined based on an angular velocity detected by a second vibration detection unit that detects an angular velocity of vibration, as subject vectors that indicate movement of a subject, and outputting an average value of the extracted subject vectors; and obtaining, in panning shooting, a correction amount of a correction unit that optically corrects vibration based on the average value and the angular velocity in a case where the subject vectors were extracted in the extracting, wherein, in the extracting, the range is set narrower in a case where the angular velocity is less than a predetermined threshold value than in a case where the angular velocity is greater than or equal to the threshold value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. Note that, in the following description, image stabilization control in one of a yaw direction and a pitch direction of an image will be described, and image stabilization control in the other direction is similar, and therefore description thereof will be omitted.

Figure 1:
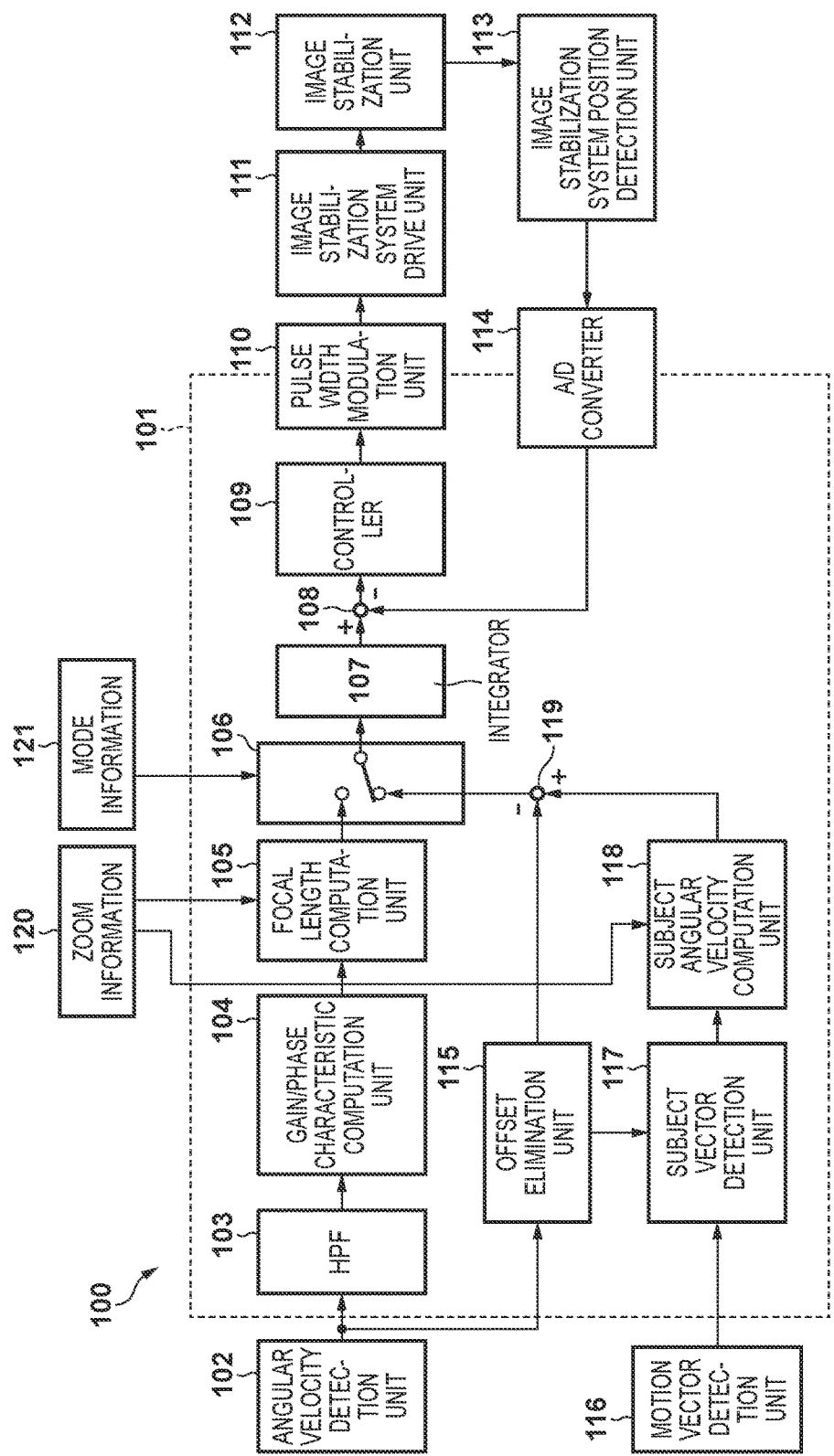
FIG. 1 is a block diagram illustrating a functional configuration of an image stabilization apparatus according to an embodiment of a present invention.

FIG. 1 is a block diagram illustrating a configuration of an image stabilization apparatus 100 mounted in a digital camera, serving as an example of an image stabilization apparatus of the present invention. Hereinafter, constituent units and exemplary operations thereof in the image stabilization apparatus 100 in FIG. 1 will be specifically described.

An angular velocity detection unit 102 detects, using a sensor such as a gyro sensor, a camera shake amount that is applied to the camera as an angular velocity, converts the angular velocity to a voltage, and outputs the voltage as a vibration signal (angular velocity data). The angular velocity data that is output from the angular velocity detection unit 102 is supplied to a high-pass filter (HPF) 103 in a μCOM 101. The HPF 103 has a function of changing filtering characteristics in an arbitrary frequency band, cuts off a low frequency component included in the angular velocity data, and outputs a high frequency component signal. Note that a configuration may be adopted in which, in place of the HPF 103, a signal resulting from causing an output of the angular velocity detection unit 102 to pass through a low-pass filter (LPF) that cuts off a high frequency component signal is subtracted from the output of the angular velocity detection unit 102.

A gain/phase characteristic computation unit 104 is constituted by an amplifier that amplifies the output of the HPF 103, which is input data, with a predetermined gain, and a phase compensation filter.

A focal length computation unit 105 calculates a focal length of an unshown imaging optical system from zoom information 120 that shows the state of a zoom lens included in the imaging optical system of the digital camera, and corrects the output of the gain/phase characteristic computation unit 104 so as to have a value appropriate for driving an image stabilization unit 112. Note that the imaging optical system may be incorporated in the digital camera, or may be detachably attached to the digital camera.

Meanwhile, a motion vector detection unit 116 detects a motion vector of an image based on a luminance signal included in a current video signal generated by an unshown signal processing unit included in the camera and a luminance signal included in a video signal of the previous frame. The motion vector detected by the motion vector detection unit 116 is supplied to a subject vector detection unit 117.

Also, the subject vector detection unit 117 receives an on-imaging plane moving amount on an imaging plane that results from converting an angular velocity from which an offset component has been eliminated from the output of the angular velocity detection unit 102 by an offset elimination unit 115. The subject vector detection unit 117 separates motion vectors in a frame into subject vectors and background vectors using the received on-imaging plane moving amount. Note that the offset elimination unit 115 may use, as the offset component, an average value of the angular velocity detection unit 102 when the camera is in a stationary state or a value resulting from converting a background vector of the previous frame that is detected by the subject vector detection unit 117 to an angular velocity.

A subject angular velocity computation unit 118 converts the subject vector that is an output of the subject vector detection unit 117 to a subject angular velocity using pieces of information such as a focal length and a frame rate included in the zoom information 120. A subtracter 119 subtracts an angular velocity of the image stabilization apparatus that is an output of the offset elimination unit 115 from the subject angular velocity calculated by the subject angular velocity computation unit 118, that is, calculates a differential angular velocity between the subject and the camera.

A switch 106 that selects a target signal of the image stabilization unit 112 switches between the output of the focal length computation unit 105 and the output of the subtracter 119 according to mode information 121 that designates subject stabilization correction or image stabilization. When the mode information 121 designates a panning shot mode, the switch 106 supplies an output signal of the subtracter 119 to an integrator 107, and the subject stabilization, which will be described later, in which the image blur of the subject is corrected is performed. When the mode information 121 does not designate the panning shot mode, the switch 106 supplies an output of the focal length computation unit 105 to the integrator 107, and the image stabilization in which image blur of an entire image is corrected is performed.

Here, the mode information 121 designates the panning shot mode in the following cases. When a user selects the panning shot mode provided in a mode setting of a dial included in an unshown operation unit provided in the camera, the mode information 121 designates the panning shot mode. Also, the panning shot mode may be determined by comparing outputs of the angular velocity detection unit 102 in a yaw direction and a pitch direction. In this case, if the output of the angular velocity detection unit 102 in one axis is larger than the output of the angular velocity detection unit 102 in the other axis (by 10 dps or more, for example), it is determined to be in the panning (or tilting) state, and the mode information 121 designates the panning shot mode. Note that the switch 106 is controlled so as to select the output of the focal length computation unit 105 in the case where the later-described subject vector cannot be detected even in the panning shot mode.

The integrator 107 has a function of changing characteristics in an arbitrary frequency band, integrates the outputs of the switch 106, and calculates a drive amount of the image stabilization unit 112.

A subtracter 108 subtracts, from the output of the integrator 107, the data converted by an A/D converter 114 and thus digitized from a signal that indicates the position of the image stabilization unit 112 that is output from an image stabilization system position detection unit 113, and supplies the subtracted result to a controller 109.

The controller 109 is constituted by an amplifier that amplifies input data with a predetermined gain, and a phase compensation filter. The deviation data that is supplied from the subtracter 108 is subjected to signal processing by the amplifier and the phase compensation filter in the controller 109, and the resultant signal is output to a pulse width modulation unit 110.

The pulse width modulation unit 110 modulates the data supplied through the controller 109 to a waveform (that is, PWM waveform) in which the duty ratio of a pulse wave is changed, and supplies the waveform to an image stabilization system drive unit 111.

The image stabilization system drive unit 111 is a voice coil type motor for driving the image stabilization unit 112, and the image stabilization unit 112 is moved in a direction orthogonal to an optical axis as a result of being driven by the image stabilization system drive unit 111. An image stabilization system position detection unit 113 is constituted by a magnet and a Hall sensor that is provided at a position so as to oppose the magnet, detects a moving amount of the image stabilization unit 112 in the direction orthogonal to the optical axis, and supplies the detection result to the aforementioned subtracter 108 via the A/D converter 114. The image stabilization unit 112 is a shift lens, for example, and is a correction system in which the optical axis is shifted as a result of being moved in the direction orthogonal to the optical axis, and that can optically correct vibration. Alternatively, an unshown image sensor provided in the digital camera may be moved in the direction orthogonal to the optical axis. As a result, an image in which movement of the subject on the imaging plane generated due to vibration or the like of the apparatus has been corrected is formed in the image sensor.

Figure 2:
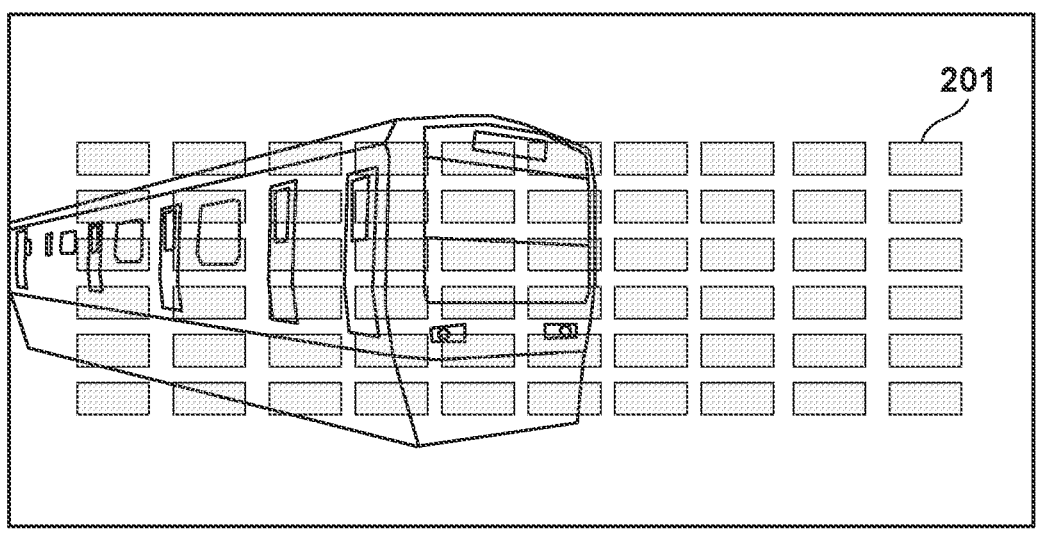
FIG. 2 is a diagram illustrating an exemplary arrangement of detection blocks of motion vectors according to the embodiment.

Here, the processing performed in the subject vector detection unit 117 will be described. FIG. 2 illustrates an example of a shooting scene in panning shooting, and six, in the vertical direction, and ten, in the horizontal direction, (a plurality of) detection blocks 201 of motion vectors are arranged in the frame. In this case, the motion vector detection unit 116 outputs 60 pieces of vector data for each frame.

Figure 3A:
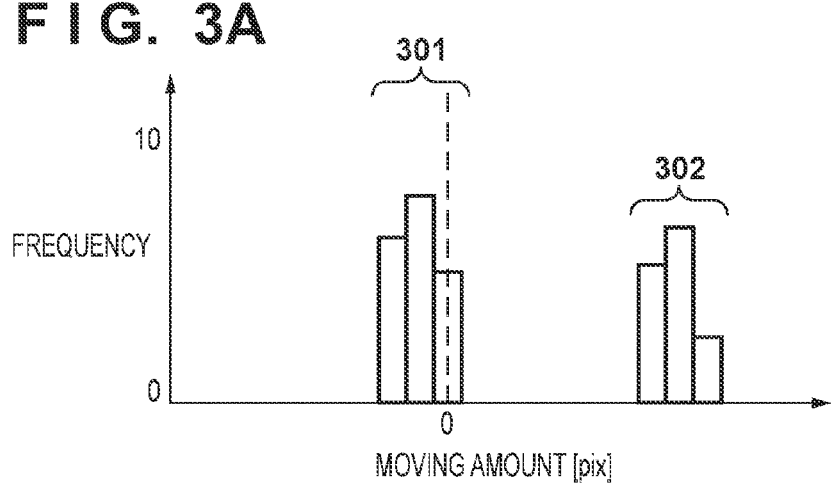
FIGS. 3A to 3C are diagrams for describing histograms of motion vectors according to the embodiment.

An example of a histogram of the 60 pieces of the vector data is shown in FIG. 3A. The horizontal axis in FIG. 3A shows moving amounts of vectors, and the vertical axis in FIG. 3A shows frequency. In the case where only one subject exists in the screen, as shown in FIG. 2, the histogram shows, roughly divided, two vector groups, namely a first vector group 301 and a second vector group 302. In the case where the subject vector is determined from the histogram, it can be determined that the first vector group 301 whose moving amounts are in the vicinity of 0 pixel is of the subject, and the second vector group 302 whose moving amounts are separate from 0 pixel by an amount that is greater than or equal to a certain value is of the background. However, a vector group exists in the vicinity of 0 pixel of moving amount only in the case where the user appropriately follows the subject. In the case of a user unaccustomed to panning shooting, the difference between the angular velocity of the movement of a subject and the angular velocity of the camera that follows the subject increases. Accordingly, because the first vector group 301 separates from 0 pixel, it becomes difficult to determine which of the first vector group 301 and the second vector group 302 is the subject vector group, and the other is the background vector group.

Figure 3B:
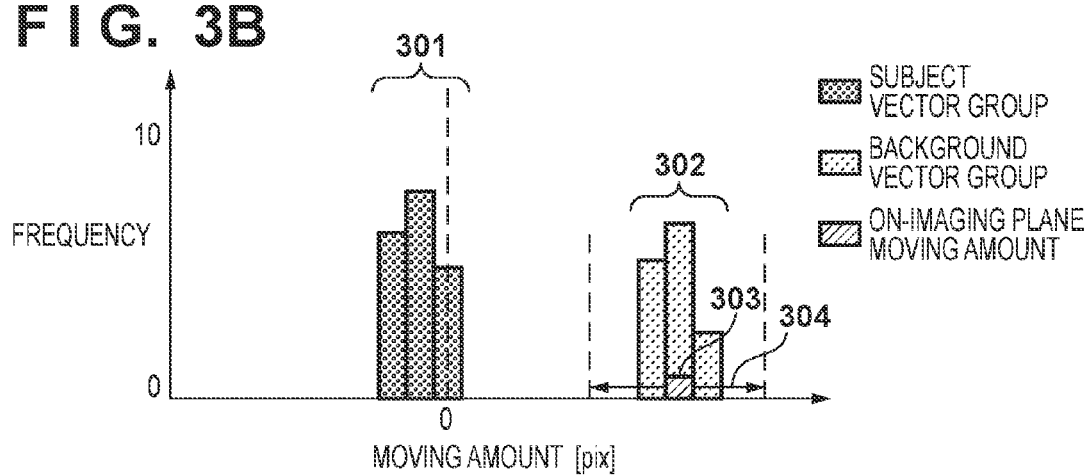

Therefore, as shown in FIG. 3B, vectors that exist in a range that is within a threshold 304 of the background region with an on-imaging plane moving amount 303 being at the center, which results from converting the angular velocity that is an output of the angular velocity detection unit 102, are determined as background vector candidates, and vectors that exist outside the range that is within the threshold 304 of the background region with the on-imaging plane moving amount 303 being at the center, are determined as subject vector candidates. Here, the reason why the threshold 304 of the background region with the on-imaging plane moving amount 303 being at the center is used is because the angular velocity that is an output of the angular velocity detection unit 102 is one piece of data per frame, while the number of pieces of vector data that are output from the motion vector detection unit 116 is 60 per frame (six in the vertical direction and ten in the horizontal direction, for example). That is, because most of the vectors are determined as being a subject vector. It is preferable that the threshold 304 of the background region is changed according to the output of the angular velocity detection unit 102. The reason will be described with reference to FIGS. 4A and 4B.

Figure 4A:
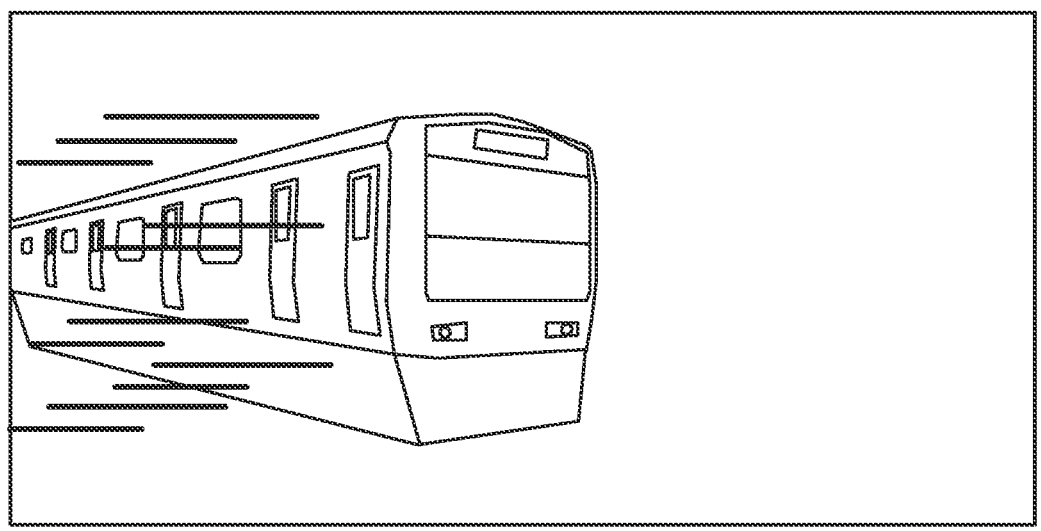
FIGS. 4A and 4B are diagrams for describing a use case according to the embodiment.

FIG. 4A shows a shooting scene of a panning shot of a train (a subject having a fast moving speed). At this time, the focal length is 50 mm, for example, and the panning angular velocity is 40 dps, for example. The histogram of pieces of vector data obtained in this shooting scene is as shown in FIG. 3B. The first vector group 301 (subject vector group) of the subject portion exists in the vicinity of 0 pixel if the user followed the subject appropriately. The second vector group 302 (background vector group) of the background portion exists in a region within the threshold 304 of the background region (±10 pixels, for example) with the on-imaging plane moving amount 303 being at the center, which is obtained from the output of the angular velocity detection unit 102.

Figure 3C:
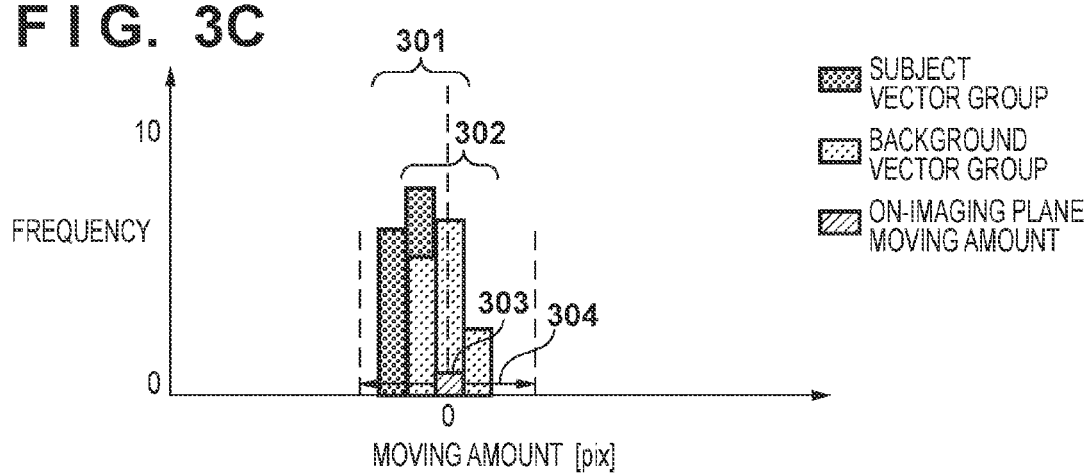
Figure 4B:
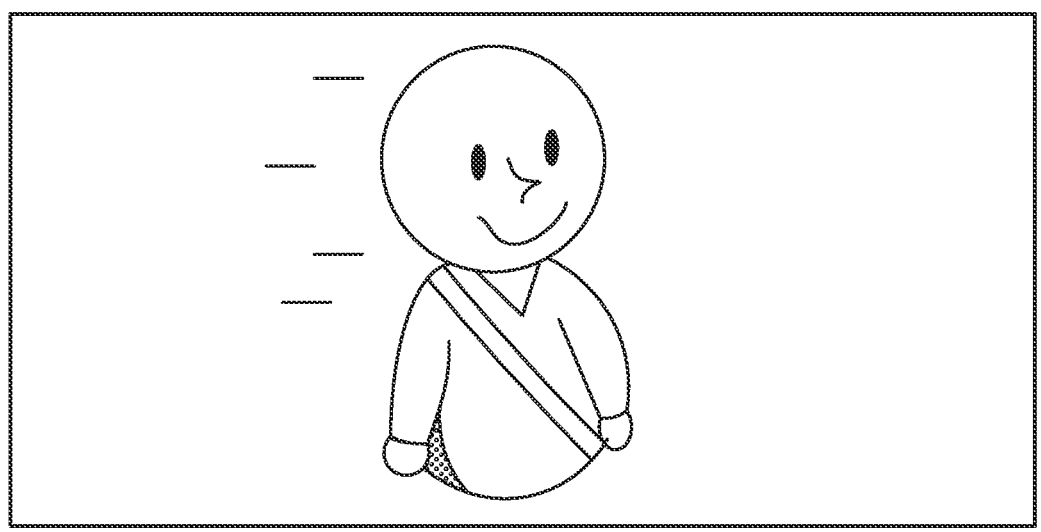

On the other hand, FIG. 4B shows a shooting scene of a panning shot of a small child (a subject having a slow moving speed). At this time, the focal length is 50 mm, for example, and the panning angular velocity is 5 dps, for example. The histogram of pieces of vector data obtained in this shooting scene is as shown in FIG. 3C. In the case of the value of the threshold 304 of the background region being a constant value, when the user has appropriately followed the subject, and the panning angular velocity is low, the subject vector group 301 and the background vector group 302 exist in a range within the threshold 304 of the background region. In this case, it is erroneously detected that a subject vector does not exist despite the fact that a subject vector exists.

Therefore, in the present embodiment, the subject vector can be more accurately detected even in a shooting scene such as shown in FIG. 4B by changing the value that the threshold 304 of the background region can take with the on-imaging plane moving amount 303 being at the center according to the output of the angular velocity detection unit 102.

Figure 5:
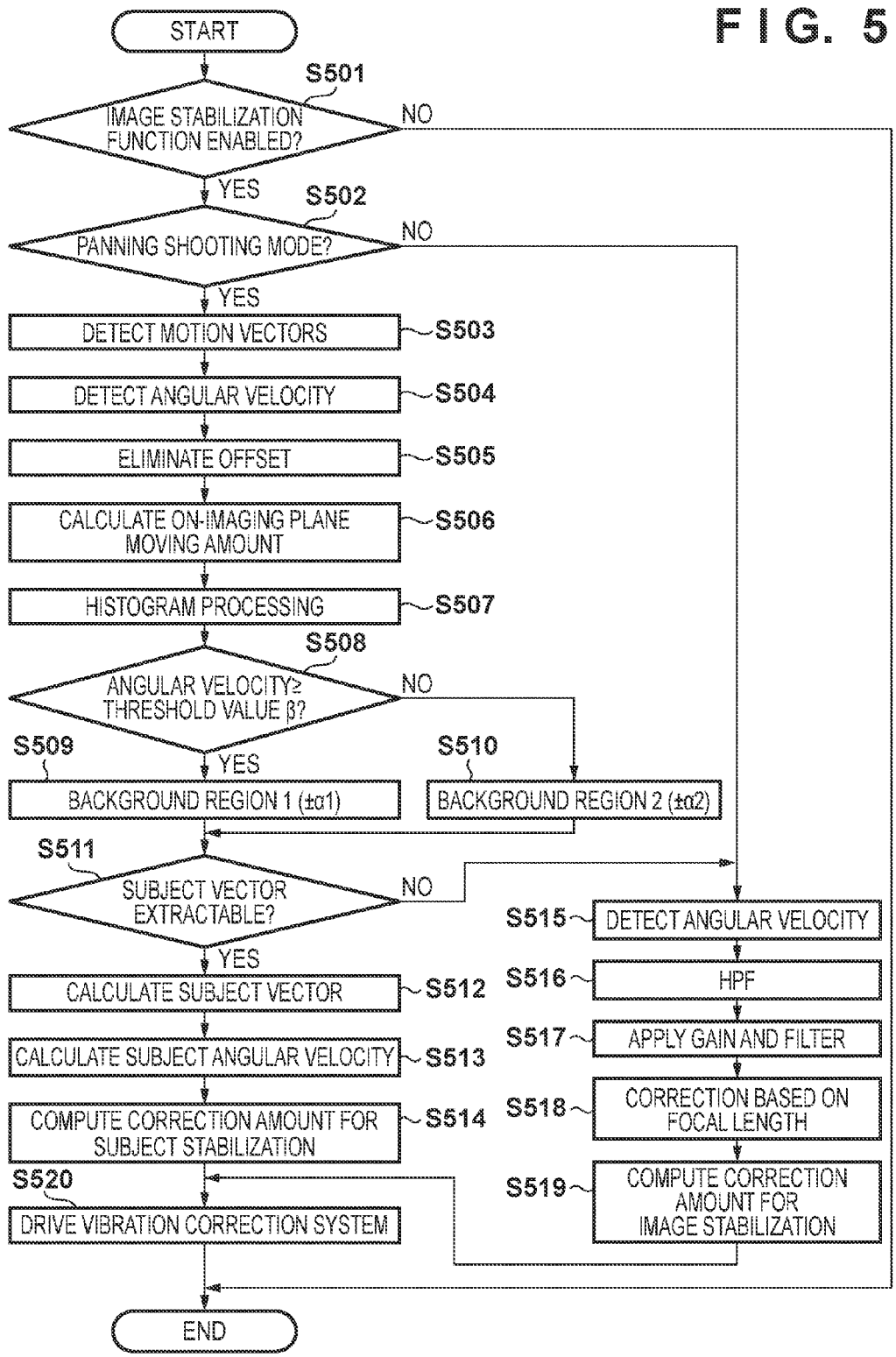
FIG. 5 is a flowchart illustrating image stabilization processing according to the embodiment.

Next, the image stabilization processing in the present embodiment will be described with reference to a flowchart in FIG. 5.

First, it is determined whether or not the image stabilization function is enabled in step S501. If Yes, the processing advances to step S502. If the image stabilization function is disabled, the image stabilization unit 112 continues to be located in the optical center position and does not perform image stabilization control. In step S502, it is determined whether or not the mode is the panning shot mode based on the determination value of the mode information as described above. If the mode is the panning shot mode, the processing advances to step S503, and if the mode is not the panning shot mode, the processing advances to step S515.

In step S503, the motion vector detection unit 116 detects the motion vectors of one frame. Next, in step S504, an average value of angular velocity between the barycenters of respective exposure periods of two frames is acquired from the angular velocity that is an output of the angular velocity detection unit 102. Here, the reason why the average value of angular velocity between the barycenters of exposure periods is obtained is because the motion vector detection unit 116 detects the difference vector between frames whose time of shooting can be represented by the barycenters of exposure periods. Accordingly, when the histogram of on-imaging plane moving amounts on the imaging plane is generated from the output of the motion vector detection unit 116 and the output of the angular velocity detection unit 102 in later-described step S507, the two units can be synchronized.

In step S505, an offset component is eliminated from the average value of the angular velocity between the barycenters of exposure periods obtained in step S504. The reason why the offset component is eliminated is to prevent the subject vector from being erroneously detected in a later-described subject vector calculation due to the on-imaging plane moving amount, which is converted from the angular velocity, being offset by an amount corresponding to the offset of the average value of the angular velocity. In step S506, the average value of the angular velocity between the barycenters of exposure periods from which the offset component was eliminated in step S505 is converted to an on-imaging plane moving amount on the imaging plane using the frame rate and focal length information. Here, the reason why the angular velocity information is converted to the on-imaging plane moving amount is to use the on-imaging plane moving amount obtained from the angular velocity in the later-described determination of the subject vector.

Next, in step S507, a histogram is generated from the motion vectors detected in step S503. If the setting of the number of detection blocks used by the motion vector detection unit 116 is six in the vertical direction and ten in the horizontal direction, for example, a histogram constituted by 60 motion vectors in total is generated. Also, the on-imaging plane moving amount on the imaging plane calculated in S506 is used to generate the histogram. Here, since the number of pieces of data of the angular velocity obtained per one frame is one, ±α from the on-imaging plane moving amount on the imaging plane is set as the threshold of the background region.

In step S508, whether or not the angular velocity is greater than or equal to a pre-set threshold value β (15 dps, for example) is determined in order to change the range of the aforementioned background region α according to the output of the angular velocity. If the angular velocity is greater than or equal to the threshold value β, the processing advances to step S509, and if the angular velocity is less than the threshold value β, the processing advances to step S510.

Figure 6:
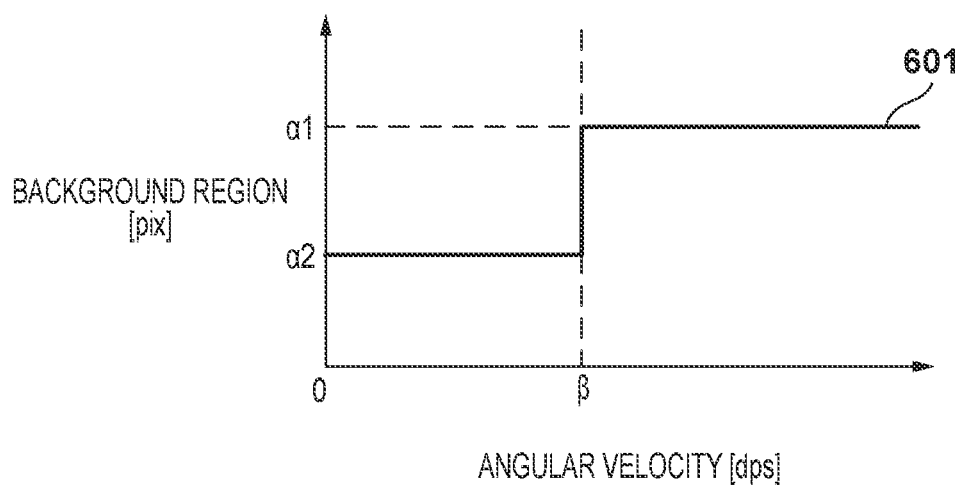
FIG. 6 is a diagram illustrating a relationship between an angular velocity and a threshold value of a background region according to the embodiment.

In step S508, if it is determined that panning (or tilting) has been performed with an angular velocity that is greater than or equal to the threshold value β, it is conceivable that a histogram is formed such that the first vector group 301 and the second vector group 302 are formed so as to be separated from each other by a certain amount or more, such as shown in FIG. 3B. Therefore, in step S509, the value of the threshold 304 of the background region is set to value α1 (±10 pixels, for example), as shown in FIG. 6.

On the other hand, in step S508, if it is determined that panning (or tilting) has been performed with an angular velocity that is less than the threshold value β, it is conceivable that a histogram is formed such that the first vector group 301 and the second vector group 302 are formed so as to be located very close to each other, as shown in FIG. 3C. Therefore, in step S510, the value of the threshold 304 of the background region is set to value α2 (±3 pixels, for example), as shown in FIG. 6.

Note that the number of threshold values of the angular velocity β is set to one in the present embodiment, but the number thereof is not limited to one, and may be two or more. Also, the number of threshold values of the background region α is set to two in the present embodiment, but the number thereof is not limited to two, and may be three or more according to the threshold value of the angular velocity β.

Next, in step S511, it is determined whether or not the subject vector can be extracted. If the subject vector can be extracted, the processing advances to step S512, and if the subject vector cannot be extracted, the processing advances to step S516. Note that the determination as to whether or not the subject vector can be extracted is performed as follows. First, in the histogram generated in step S507, it is determined that vectors within the threshold 304 of the background region, which is set in step S509 or step S510, are candidates for the background vector group, and vectors outside the threshold 304 of the background region are candidates for the subject vector group. Then, if the frequency of the vectors that form the peak in each of the vector groups is greater than or equal to a threshold value (five, for example), it is determined that the vectors have been properly detected. In this case, the subject vectors and the background vectors can be ultimately extracted.

If it is determined that the subject vectors can be extracted in step S511, a correction signal for the image stabilization is calculated in the processing in step S512 onward. First, the subject vector group is extracted, and the average value of the vectors is calculated. Hereinafter, the average value of the vectors is referred as a "subject vector". Next, in step S513, the subject angular velocity computation unit 118 converts the calculated subject vector to an angular velocity using the focal length and the frame rate, and the subtracter 119 subtracts therefrom the angular velocity of the image stabilization apparatus that is the output of the offset elimination unit 115. In step S514, the subject angular velocity calculated in step S513 is integrated, and a correction signal (correction amount) for the subject stabilization is obtained.

On the other hand, in step S515, because it is not in the panning shot mode, or the subject vector cannot be detected even in the panning shot mode, an angular velocity is acquired from the angular velocity detection unit 102 in order to perform normal image stabilization. Note that, in step S515, while the average value of the angular velocity between the barycenters of exposure periods is acquired in step S504, angular velocities are acquired in a fixed interrupt period (sampling at 4 kHz, for example) instead of the average of the angular velocity between the barycenters of exposure periods.

In step S516, because the output of the angular velocity detection unit 102 includes a direct current component, the output is input to the HPF 103, and the direct current component is eliminated. Next, in step S517, the output of the HPF 103 is processed by the gain/phase characteristic computation unit 104, which is constituted by an amplifier that amplifies with a predetermined gain and a phase compensation filter, such that the output of the angular velocity detection unit 102 from which the direct current component has been eliminated has a desired frequency characteristic. In step S518, the focal length computation unit 105 calculates the focal length of the imaging optical system, and corrects the output of the gain/phase characteristic computation unit 104 so as to have a value that is optimum for driving the image stabilization unit 112. In step S519, the value obtained in step S518 is integrated so as to calculate the correction signal for image stabilization.

In step S520, the correction signal for the subject stabilization that is calculated in step S514 or the correction signal for the image stabilization that is calculated in step S519 is supplied to the subtracter 108, and the deviation data is supplied to the image stabilization system drive unit 111 via the controller 109 and the pulse width modulation unit 110. The image stabilization system drive unit 111 drives the image stabilization unit 112 based on the correction signal obtained in this way.

As described above, even in the case where the panning angular velocity is low, as a result of changing the range of the on-imaging plane moving amount that is obtained from the angular velocity according to the angular velocity, the detection accuracy of the subject vector can be improved.

Note that the image stabilization apparatus 100 that is mounted in a digital camera such as a digital single lens reflex camera or digital compact camera is described in the embodiment described above, but the present invention is not limited thereto. For example, the image stabilization apparatus 100 may be mounted in an image capturing apparatus such as a monitoring camera, a Web camera, or a mobile phone.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-012790, filed on Jan. 26, 2016 which is hereby incorporated by reference herein in its entirety.

What is claimed is:

1. A vibration detection apparatus comprising:
an extraction unit that extracts, from among a plurality of motion vectors that are detected by a first vibration detection unit that obtains and outputs, from a difference between frames of images that are output from an image sensor mounted on an image capturing apparatus, the motion vectors respectively for a predetermined plurality of regions that are set in the images, motion vectors that exist outside a range that is determined based on an angular velocity detected by a second vibration detection unit that detects an angular velocity of vibration of the image capturing apparatus, as subject vectors that indicate movement of a subject; and an acquisition unit that obtains, in a panning shot, a correction amount of a correction unit that optically corrects vibration based on the subject vectors extracted by the extraction unit, wherein the extraction unit sets the range narrower in a case where the angular velocity is less than a predetermined threshold value than in a case where the angular velocity is greater than or equal to the threshold value.

2. The vibration detection apparatus according to claim 1, wherein the extraction unit sets the range with a value that is converted from the angular velocity to a moving amount in the image at the center of the range.

3. The vibration detection apparatus according to claim 1, wherein the extraction unit generates a histogram of the motion vectors, and extracts the subject vectors in a case where a frequency of vectors that form a peak, in each formed vector group, is greater than or equal to a predetermined threshold value.

4. The vibration detection apparatus according to claim 1, wherein the acquisition unit obtains a correction amount of the correction unit based on the angular velocity in a case of not performing the panning shooting or in a case where the extraction unit could not extract the subject vectors.

5. The vibration detection apparatus according to claim 1, wherein a plurality of threshold values that are different from each other are set as the threshold value, and for each of the threshold values, the range is reduced in a case where the angular velocity is less than the threshold value to be smaller than that in a case where the angular velocity is greater than or equal to the threshold value.

6. An image capturing apparatus comprising:
a vibration detection apparatus including:
an extraction unit that extracts, from among a plurality of motion vectors that are detected by a first vibration detection unit that obtains and outputs, from a difference between frames of images that are output from an image sensor mounted on an image capturing apparatus, the motion vectors respectively for a predetermined plurality of regions that are set in the images, motion vectors that exist outside a range that is determined based on an angular velocity detected by a second vibration detection unit that detects an angular velocity of vibration of the image capturing apparatus, as subject vectors that indicate movement of a subject; and
an acquisition unit that obtains, in panning shooting, a correction amount of a correction unit that optically corrects vibration based on the subject vectors extracted by the extraction unit,
wherein the extraction unit sets the range narrower in a case where the angular velocity is less than a predetermined threshold value than in a case where the angular velocity is greater than or equal to the threshold value; and the image sensor,
wherein the image capturing apparatus can be attached to or detached from an imaging optical system that includes the correction unit.

7. An image capturing apparatus comprising:
a vibration detection apparatus including:
an extraction unit that extracts, from among a plurality of motion vectors that are detected by a first vibration detection unit that obtains and outputs, from a difference between frames of images that are output from an image sensor mounted on an image capturing apparatus, the motion vectors respectively for a predetermined plurality of regions that are set in the images, motion vectors that exist outside a range that is determined based on an angular velocity detected by a second vibration detection unit that detects an angular velocity of vibration of the image capturing apparatus, as subject vectors that indicate movement of a subject; and
an acquisition unit that obtains, in panning shooting, a correction amount of a correction unit that optically corrects vibration based on the subject vectors extracted by the extraction unit,
wherein the extraction unit sets the range narrower in a case where the angular velocity is less than a predetermined threshold value than in a case where the angular velocity is greater than or equal to the threshold value;
the image sensor; and
the correction unit that optically corrects vibration based on a correction amount.

8. A vibration detection method comprising:
extracting, from among a plurality of motion vectors that are detected by a first vibration detection unit that obtains and outputs, from a difference between frames of images that are output from an image sensor mounted on an image capturing apparatus, the motion vectors respectively for a predetermined plurality of regions that are set in the images, motion vectors that exist outside a range that is determined based on an angular velocity detected by a second vibration detection unit that detects an angular velocity of vibration of the image capturing apparatus, as subject vectors that indicate movement of a subject; and
obtaining, in panning shooting, a correction amount of a correction unit that optically corrects vibration based on the subject vectors extracted in the extracting,
wherein, in the extracting, the range is set narrower in a case where the angular velocity is less than a predetermined threshold value than in a case where the angular velocity is greater than or equal to the threshold value.

9. The vibration detection apparatus according to claim 1, wherein the acquisition unit obtains, in the panning shot, the correction amount based on an average value of the extracted subject vectors and the angular velocity in a case where the subject vectors were extracted.

10. The vibration detection apparatus according to claim 1, wherein the extraction unit extracts, from among the plurality of motion vectors that are detected by the first vibration detection unit, motion vectors that exist inside a range that is determined based on the angular velocity detected by the second vibration detection unit, as background vectors.

* * * * *